United States Patent
Ichihara (10) Patent No.: US 8,620,274 B2
(45) Date of Patent: Dec. 31, 2013

(54) SERVER, MOBILE COMMUNICATION SYSTEM, AND DATA UPDATING METHOD IN THE SAME

(75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 1825 days.

(21) Appl. No.: 11/004,814

(22) Filed: Dec. 7, 2004

(65) Prior Publication Data

US 2005/0124323 A1 Jun. 9, 2005

(30) Foreign Application Priority Data

Dec. 9, 2003 (JP) ................................. 2003-410239

(51) Int. Cl.
*H04M 1/725* (2006.01)

(52) U.S. Cl.
USPC ..... 455/412.1; 455/418; 455/419; 455/432.2; 370/328

(58) Field of Classification Search
USPC ................ 455/418, 419, 411, 432.2; 370/328
See application file for complete search history.

(56) References Cited

U.S. PATENT DOCUMENTS

| | | | |
|---|---|---|---|
| 6,295,291 B1 | 9/2001 | Larkins | |
| 6,356,543 B2 * | 3/2002 | Hall et al. | 370/352 |
| 6,950,857 B1 * | 9/2005 | Arnold | 709/217 |
| 2002/0103881 A1 * | 8/2002 | Granade et al. | 709/218 |
| 2002/0138545 A1 | 9/2002 | Andreakis et al. | |
| 2003/0084177 A1 | 5/2003 | Mulligan | |
| 2003/0186695 A1 * | 10/2003 | Bridges et al. | 455/432 |
| 2003/0208567 A1 | 11/2003 | Gross | |
| 2004/0127205 A1 * | 7/2004 | Mahajan | 455/418 |
| 2005/0164691 A1 * | 7/2005 | Payne | 455/419 |

FOREIGN PATENT DOCUMENTS

| | | |
|---|---|---|
| CA | 2283960 | 4/2001 |
| EP | 0 827 353 A2 | 3/1998 |
| EP | 0 991 225 A2 | 4/2000 |
| EP | 1 331 559 A2 | 1/2003 |
| EP | 1 331 559 A2 | 7/2003 |
| JP | 2001-249874 A | 9/2001 |
| JP | 2001-326960 A | 11/2001 |
| JP | 2002-259283 A | 9/2002 |
| JP | 2002-262352 A | 9/2002 |
| JP | 2002-314706 A | 10/2002 |
| JP | 2002-314706 A | 10/2002 |
| WO | WO 01/77873 A2 | 10/2001 |
| WO | WO 03/054734 A1 | 7/2003 |

\* cited by examiner

*Primary Examiner* — Amancio Gonzalez (74) *Attorney, Agent, or Firm* — Foley & Lardner LLP (57) ABSTRACT

A mobile communication system comprises a server, a cellular phone and a computer. The server sends/receives data through a network. The cellular phone downloads data to be used by itself, which is stored in the server. The computer transmits data to be used by the mobile communication terminal to the server. A user of the cellular phone updates or inputs data to be installed in the cellular phone from the computer. The data can be downloaded from the computer to the cellular phone.

18 Claims, 9 Drawing Sheets

SERVER, MOBILE COMMUNICATION SYSTEM, AND DATA UPDATING METHOD IN THE SAME

BACKGROUND OF THE INVENTION

1. Field of the Invention

The present invention relates to a server, a mobile communication system, and a data updating method, and more particularly to a technology which enables data such as a phone number and an address to be easily input and updated, which are used by a mobile communication terminal and can be stored therein.

2. Description of the Related Art

A cellular phone has very large number of functions recently. A user of the cellular phone can utilize a variety of functions including the sending/receiving of e-mails, schedule management, Internet connection or the like. Therefore, a quantity of data stored in the cellular phone also increases. For example, the cellular phone can store more than a thousand phone numbers and addresses, and a quantity of data used for selective setting of a ringer and a ringer tone and setting of a sound level of the incoming call also increases. However, since the number of keys of the cellular phone is limited, it is very troublesome to perform entering of the variety of above-described data and changing thereof by use of keys.

On the other hand, software is sold, which causes a personal computer to edit data inside a cellular phone, with the personal computer and the cellular phone directly connected by a cable. However, a lot of money is necessary for buying the software, the cable, connectors and the like. Japanese Patent Laid-Open No. 2002-314706 discloses a method of changing a model of a portable terminal by a user of the portable terminal. In this method, the user stores data, which has been stored in a present portable terminal, in a server temporarily. The server edits the data so that the edited data matches a new portable terminal, and the user downloads the edited data from the server by use of a cellular phone of a new model. However, in this method, technique concerning easy entering and changing of data are not disclosed.

SUMMARY OF THE INVENTION

In a first aspect of the present invention, a server performs the sending/receiving of data between a mobile communication terminal and a computer through a network. The server comprises a database which stores data used by the mobile communication terminal for every mobile communication terminal, and a controlling unit which controls the server and controls communications between the server and the mobile communication terminal and between the server and the computer. In the computer, a WEB page is downloaded from the server, and data to be used by a predetermined mobile communication terminal is input to the computer through the WEB page. The mobile communication terminal downloads data to be used by itself from the server.

In a second aspect of the present invention, a mobile communication system comprises a server which sends/receives data through a network, a mobile communication terminal which receives data stored in the server and used by the terminal, and a computer which transmits the data to be used by the mobile communication terminal to the server.

In a third aspect of the present invention, a data updating method comprises the following steps. A computer accesses a server through a network. A WEB page concerning a predetermined mobile communication terminal is downloaded to the computer. Data to be used by the mobile communication terminal is input to the WEB page, and the data is uploaded to the server. The data is downloaded from the server to a corresponding mobile communication terminal.

In the present invention, a variety of data stored in the mobile communication terminal can be newly input, additionally written and changed by the computer easily.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
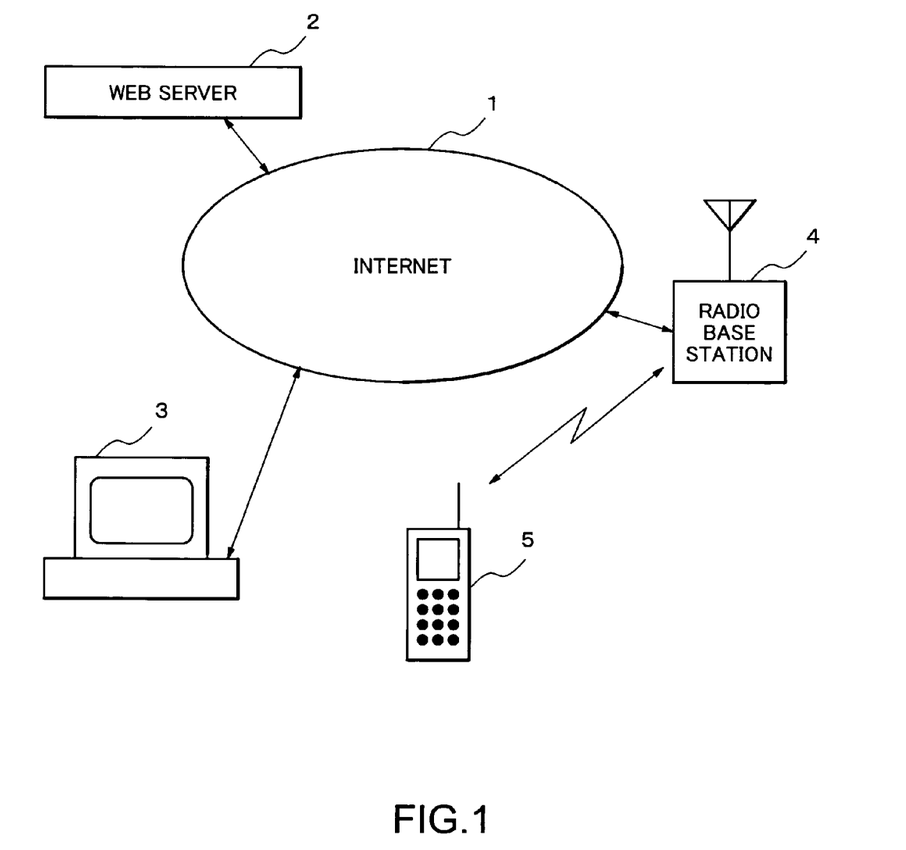
FIG. 1 is a block diagram showing a data updating system of an embodiment of the present invention.

Preferred embodiments of the present invention will be described below. Referring to FIG. 1, a mobile communication system of an embodiment comprises Internet 1, a World Wide Web server 2 (hereinafter referred to as WEB server 2), a home computer 3, a radio base station 4 and a cellular phone 5. The cellular phone 5 has a function to access the Internet and a function to send/receive e-mails. The cellular phone 5 can access the WEB server 2 through the radio base station 4 and the Internet 1. Another mobile communication terminal having the same function (for example, a PDA and the like) can also be used. The WEB server 2 stores data which the cellular phone 5 uses, and can edit the data. The computer 3 can access the server 2 through the Internet 1, and can input the data to be used by the cellular phone 5. The data used by the cellular phone 5 includes data of a phone number, data of an address, data of a bookmark, schedule data, data of a ringer tone, setting data of an incoming sound level, data for setting coloration and contrast of a display, alarm setting data, and the like. Such data has different formats for each model of the cellular phone 5.

Figure 2:
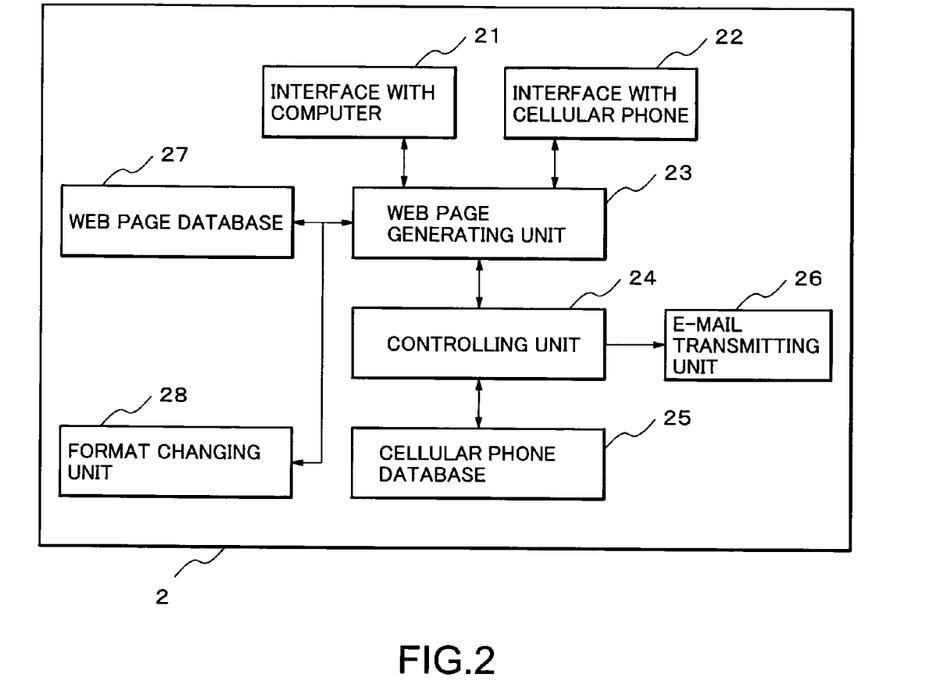
FIG. 2 is a block diagram of a server of an embodiment of the present invention.

Referring to FIG. 2, an embodiment of the server 2 providing a WEB page to the Internet 1 is disclosed. The server 2 includes an interface 21 to the computer, an interface 22 to the cellular phone, a WEB page generating unit 23, a cellular phone database 25 and a controlling unit 24. The WEB page generating unit 23 generates a WEB page for receiving the data to be used by the cellular phone 5. The cellular phone database 25 stores the data in the form of the WEB page for every phone number. The controlling unit 24 controls communications among the server 2, the home computer 3 and the cellular phone 5. The controlling unit 24 also controls various kinds of operations in the server 2. Particularly, the controlling unit 24 controls transfer of the data (the form of the WEB page) between the WEB page generating unit 23 and the cellular phone database 25.

The server 2 further includes a WEB page database 27 and a format changing unit 28. The WEB page database 27 stores the WEB page for each model of the cellular phone 5. The format changing unit 28 changes data stored in the cellular phone database 25 to a format corresponding to the model of a new cellular phone. The server 2 further includes an e-mail transmitting unit 26. When new data is input to the cellular phone database 25 and when the data stored in the database 25 is changed, the e-mail transmitting unit 26 transmits an e-mail to a corresponding cellular phone, which describes that the data is input or changed.

Figure 3:
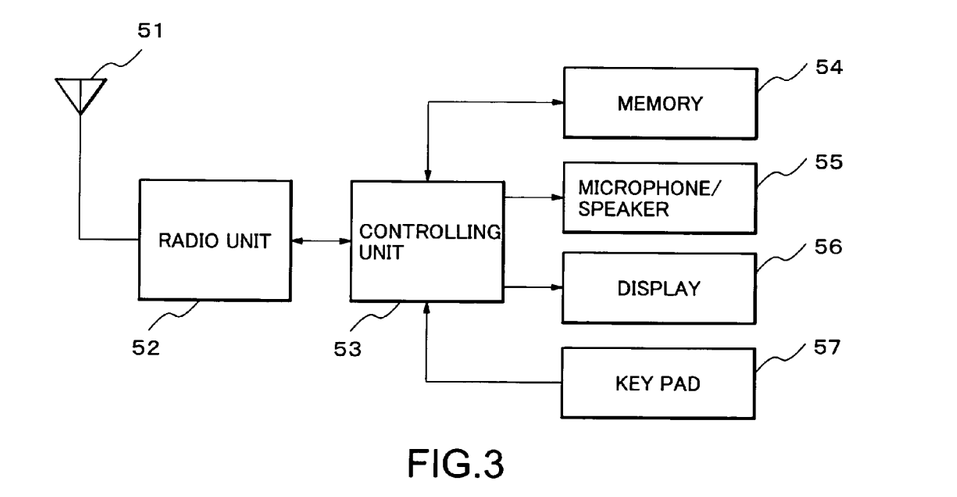
FIG. 3 is a block diagram of a cellular phone of an embodiment of the present invention.
Figure 4:
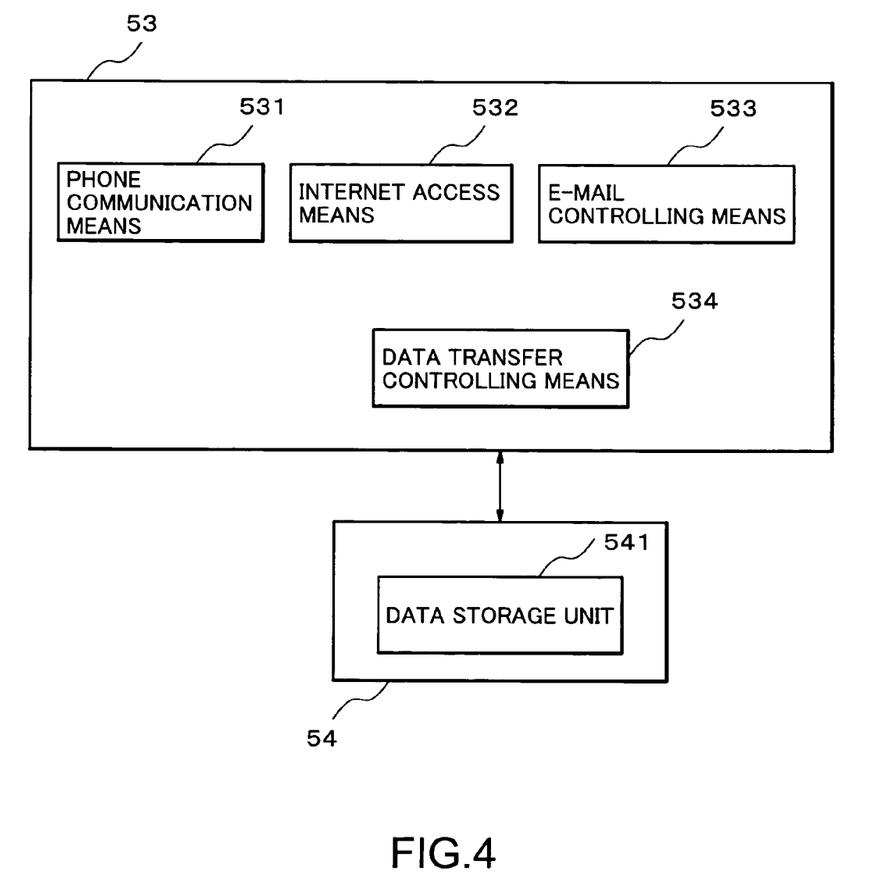
FIG. 4 is a block diagram of a part of the cellular phone of the embodiment of the present invention.

Referring to FIG. 3 and FIG. 4, the cellular phone 5 of the embodiment has an antenna 51, a radio unit 52, a controlling unit 53, a memory 54, a microphone/speaker 55, a display 56 and a key pad 57. The configuration of the cellular phone 5 shown in FIG. 3 is well-known. The controlling unit 53 further has phone communication means 531, Internet access means 532, e-mail controlling means 533 and data transfer controlling means 534. The phone communication means 531 controls an ordinary voice communication. The data transfer controlling means 534 controls generation and transfer of data in the cellular phone 5. The memory 54 has a data storage unit 541. The data storage unit 541 stores data of a phone number, address and bookmark, schedule data, setting data of a ringer tone, setting data of an incoming sound level, data for setting coloration and contrast of a display, data for setting an alarm, and the like.

Figure 5:
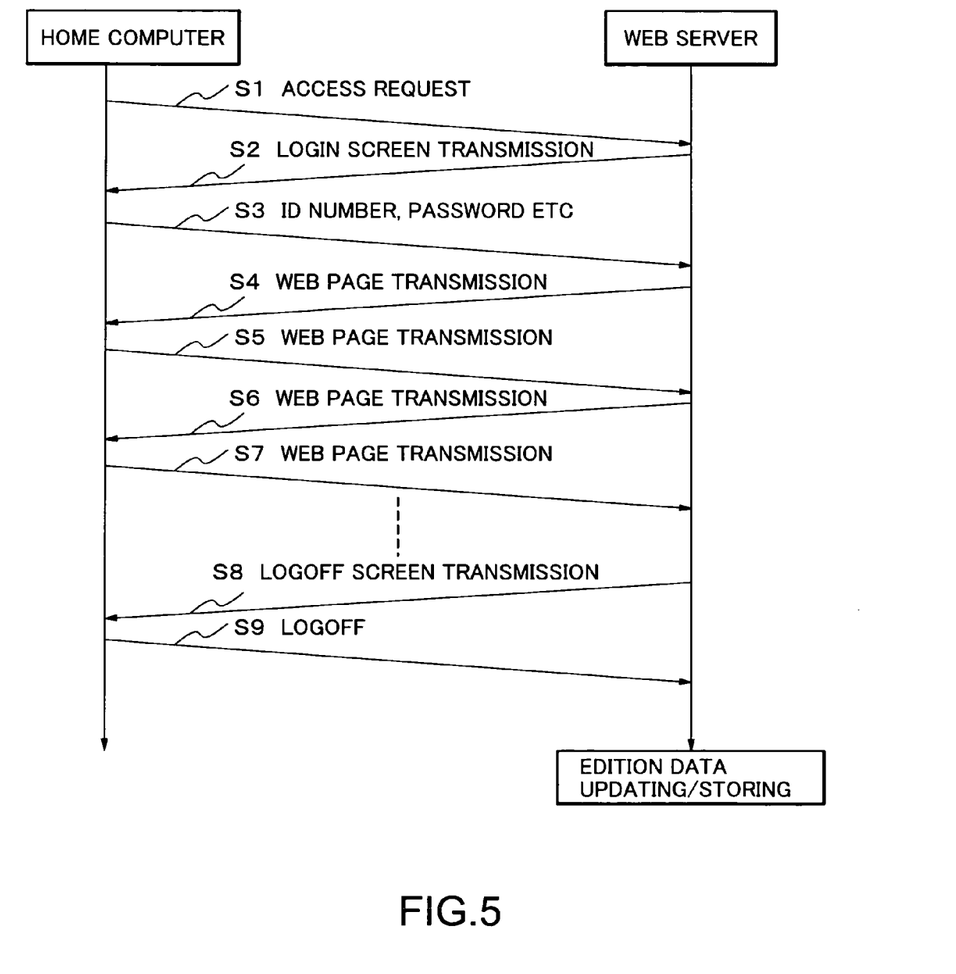
FIG. 5 is a flowchart of a part of a data updating method of an embodiment of the present invention.
Figure 6:
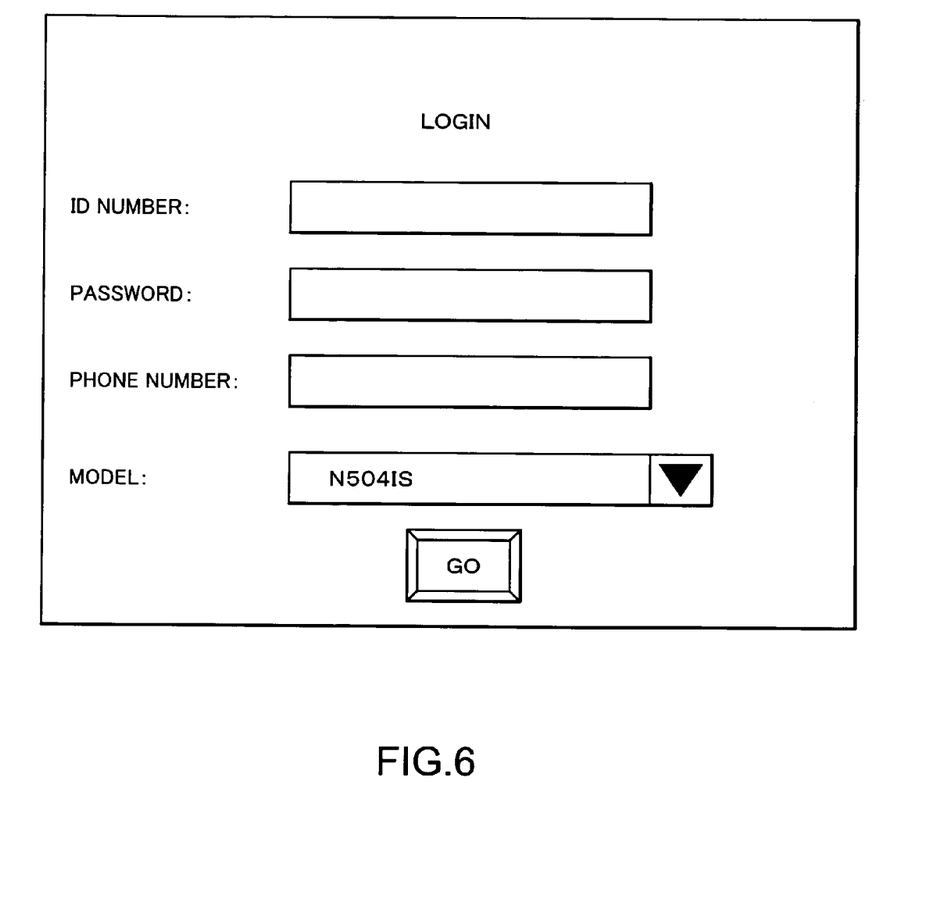
FIG. 6 is a login screen of an embodiment of the present invention.
Figure 7:
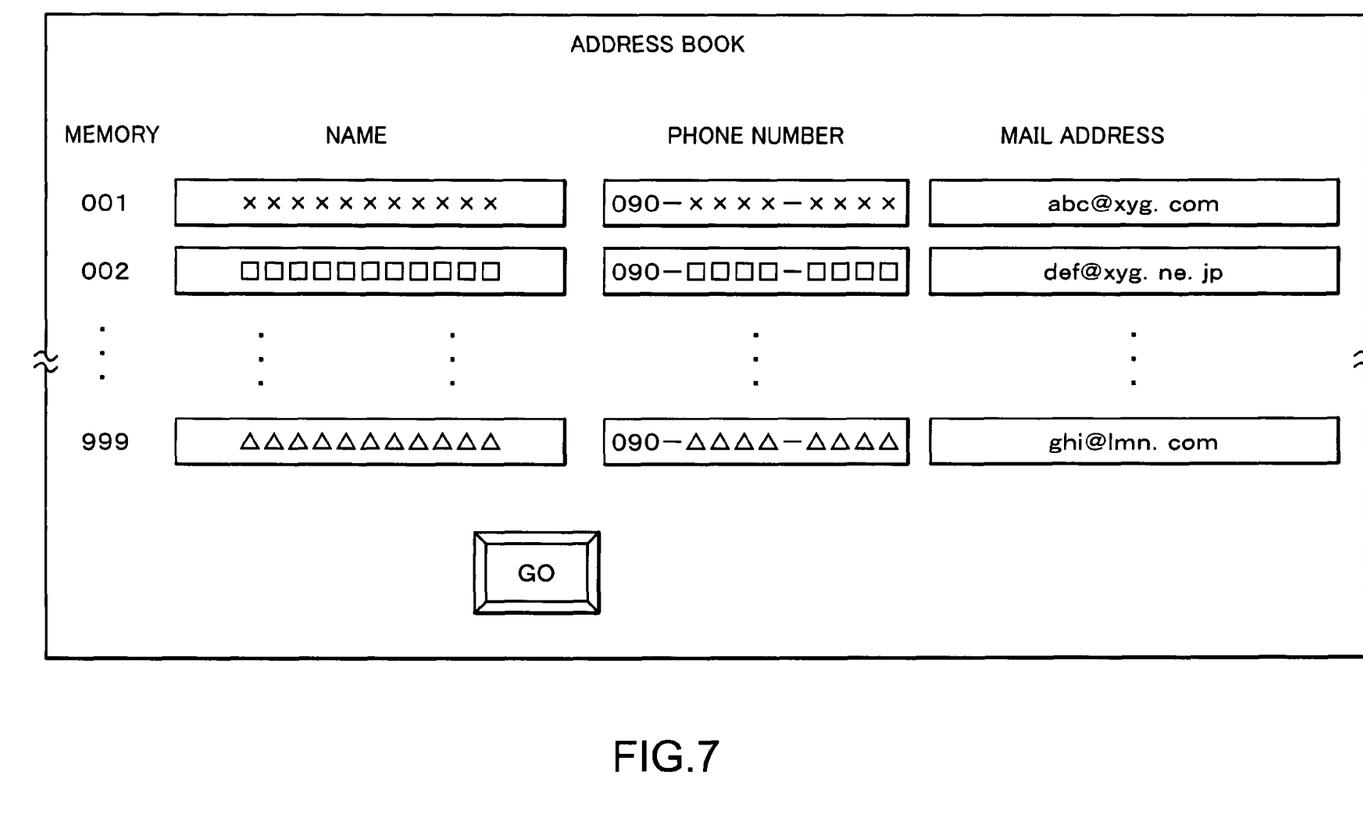
FIG. 7 shows an embodiment of a WEB page.

Referring to FIG. 5, FIG. 6 and FIG. 7, an example of a data edit operation between the home computer 3 and the WEB server 2 will be described. In FIG. 5, when a user of the cellular phone 5 edits data stored in the cellular phone 5, or when the user inputs a new data to the cellular phone 5, the user inputs a predetermined URL to the home computer 3, and accesses the WEB server 2 (S1). The WEB server 2 transmits a Login screen exemplified in FIG. 6 to the home computer 3 (S2). The user inputs his/her ID number and password and a phone number of his/her cellular phone 5 by use of the Login screen. Furthermore, the user selects a model of the cellular phone 5 by use of a pulldown menu. Thereafter, the user presses down a "GO" button, and transmits the data to the WEB server 2 (S3). The WEB server 2 authenticates the user in accordance with the received data. When the authentication of the user is completed, the WEB server 2 starts up the controlling unit 24 and the WEB page generating unit 23, and generates a WEB page corresponding to the model of the cellular phone 5 to transmit it to the home computer 3 (S4). When the WEB server 2 stores no data concerning the cellular phone 5 having a phone number input thereto, the controlling unit 24 reads out the WEB page corresponding to the model of the cellular phone 5 from the WEB page database 27, and transmits it to the home computer 3. On the other hand, when the WEB server 2 stores the data corresponding to the cellular phone 5 having the phone number input thereto, the controlling unit 24 reads the data, which is stored in the format of a WEB page, from the cellular phone database 25, and transmits it to the home computer 3. The model of the cellular phone 5, which is input from the Login screen, can be different from that of the cellular phone 5 having the same phone number stored in the cellular phone database 25. At this time, the controlling unit 24 starts up the format changing unit 28, and data read out from the cellular phone database 25 is changed so as to fit with the input model.

The data transmitted from the WEB server, which has a format of a WEB page, is an address book as shown in FIG. 7, for example. This address book has a memory number, a name field, a phone number field and a mail address field. The user of the cellular phone 5 can modify or delete data, which has been already input, by inputting new data to the address book. The address book can display HELP information. When the user presses down a "GO" button, the input data is transmitted to the WEB server 2, and stored in the cellular phone database 25. The controlling unit 24 controls the WEB page generating unit 23 and the cellular phone database 25, and can transmit next data (S6). The next data is, for example, a WEB page for editing data of a bookmark and a WEB page for editing setting data of a ringer tone. The user performs the necessary editing of the next data, and transmits it to the WEB server 2 (S7).

When the WEB server 2 receives all data, the WEB server 2 transmits a Logoff screen to the home computer 3 (S8). When the computer 3 sends back a Logoff response (S9), the editing of the above described data used by the cellular phone 5 is completed.

Figure 8:
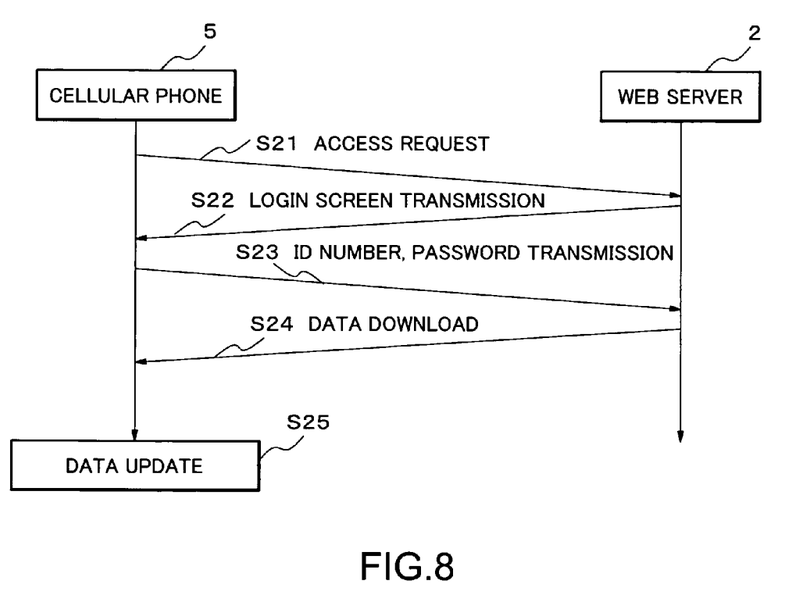
FIG. 8 is a flowchart of a part of the data updating method of the embodiment of the present invention.
Figure 9:
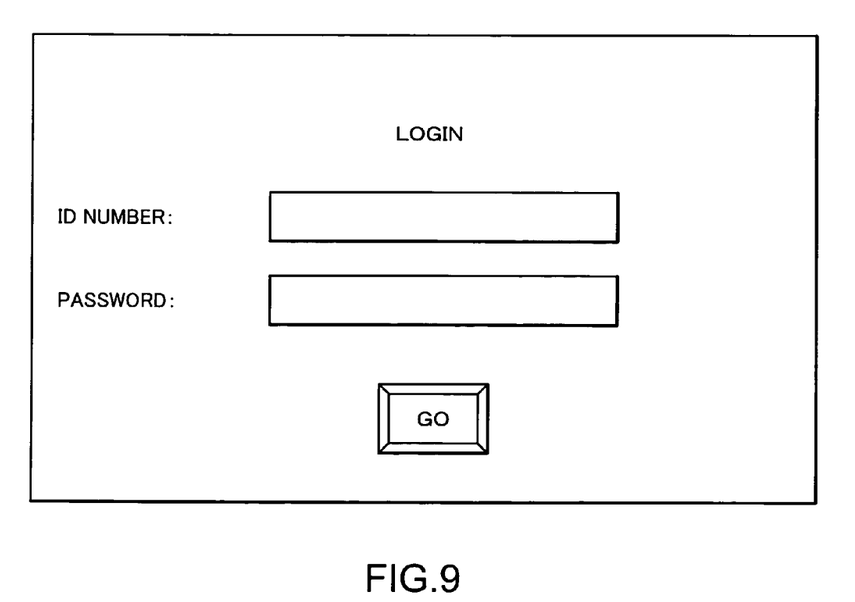
FIG. 9 is a login screen of another embodiment of the present invention.
Figure 10:
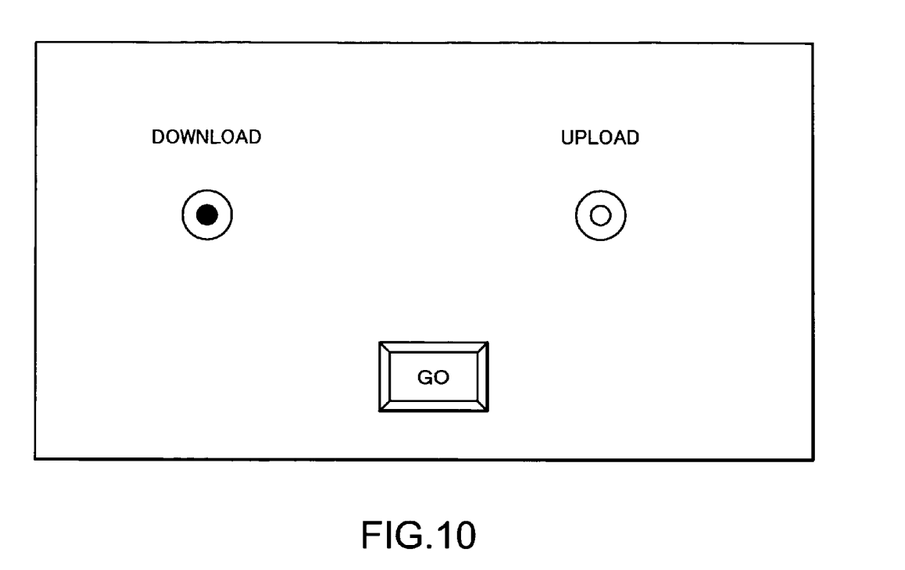
FIG. 10 is a screen for a selection of the embodiment of the present invention.

Referring to FIG. 8, FIG. 9 and FIG. 10, an example of an operation to download the data, which is stored in the cellular phone database 25 of the WEB server 2, to the cellular phone 5 will be described. The user of the cellular phone 5 starts up a WEB browser, and inputs URL of the WEB server 2, thus accessing the WEB server 2 (S21). The WEB server 2 transmits, for example, the Login screen as shown in FIG. 9 to the cellular phone 5 (S22). The user inputs an ID number and Password, and presses down the "GO" button, thus transmitting the data to the WEB server 2 (S23). The WEB server 2 authenticates the user based on the received data. When the authentication is completed, the WEB server 2 transmits a download/upload selection screen, as exemplified in FIG. 10, to the cellular phone 5. When the user selects the download and presses down the "GO" button, the WEB server 2 reads out relevant data, which takes a format of a WEB page, from the cellular phone database, and transmits it to the cellular phone 5 (S24). In the cellular phone 5, the data stored in the data storage unit 541 of the memory 54 is updated. When the WEB server 2 transmits the above-described data, the WEB server 2 can transmit a program for use in data update together with the data to the cellular phone 5. In this case, the cellular phone 5 needs not to have the data transfer controlling means 534. A controlling unit ordinarily provided in the cellular phone 5 can perform the data update by use of the program.

Figure 11:
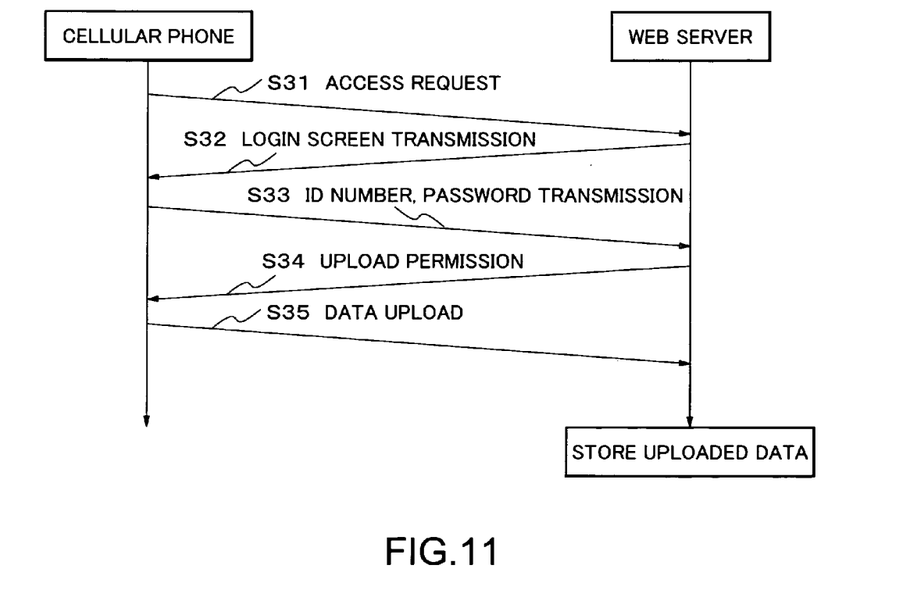
FIG. 11 is a flowchart of a part of the data updating method of the embodiment of the present invention; and, FIG. 12 is a flowchart showing an operation of an embodiment of the present invention.

FIG. 11 shows an example of an operation to upload the data, which is stored in the cellular phone 5, to the WEB server 2. The user of the cellular phone 5 executes the operations S31 to S33 similar to the above-described operations. The WEB server 2 authenticates the user based on the received data, and when the authentication for the user is completed, the WEB server 2 transmits the download/upload selection screen as exemplified in FIG. 10 to the cellular phone 5. When the user selects the upload and presses down the "GO" button, a request to upload the data of the cellular phone 5 is transmitted to the WEB server 2. Upon receipt of the upload request, the WEB server 2 transmits a signal, which permits the upload, to the cellular phone 5 (S34). Next, when the cellular phone 5 receives this signal, the data transfer controlling means 534 reads out data stored in the data storage unit 541, and transmits the read-out data to the WEB server 2 (S35). The controlling unit 24 of the WEB server 2 changes the received data to the format of a WEB page, and stores it in the cellular phone database 25. The WEB server 2 can transmit a program for use in data update together with the signal which permits the upload to the cellular phone 5. The cellular phone 5 can upload the data stored in the data storage unit 541 to the WEB server by use of the program.

Figure 12:
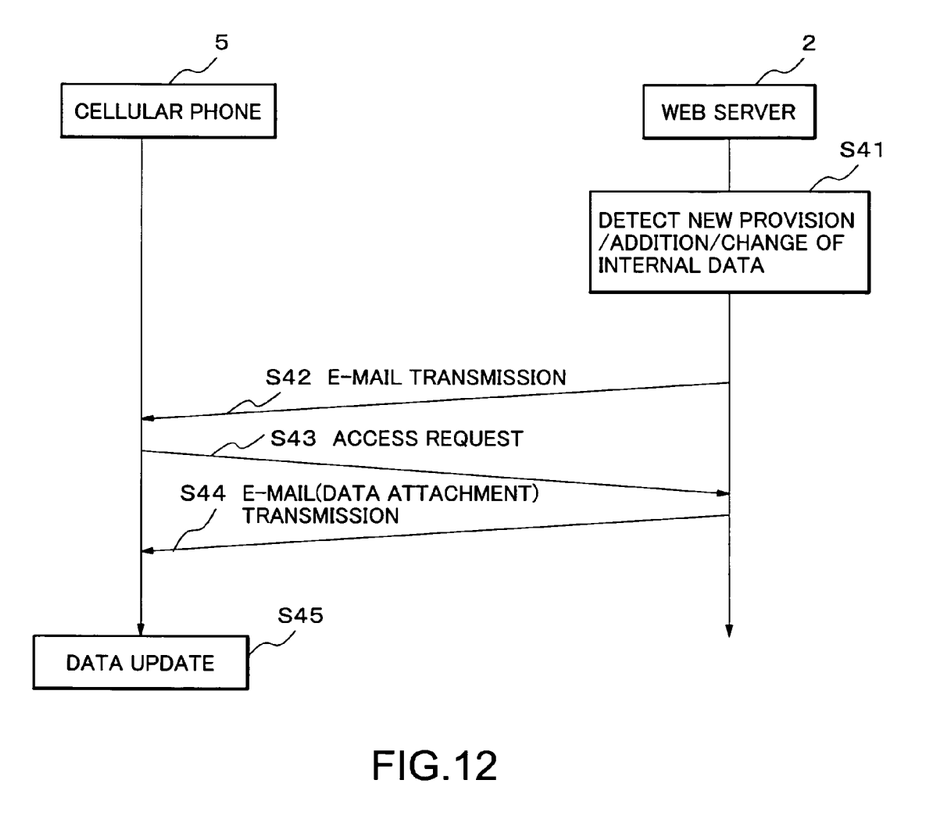

Referring to FIG. 12, another example of the operation to download the data, which is stored in the cellular phone database 25 of the WEB server 2, to the cellular phone 5 will be described. When the data is stored in the cellular phone database 25, the controlling unit 24 of the WEB server 5 determines whether the data is newly input, whether the data is added to data already input, or whether the already input data is changed (S41). The WEB server 2 notifies the decision result to a relevant cellular phone 5 by an e-mail (S42). This e-mail describes a URL to access a relevant WEB page. The user of the cellular phone 5 refers to the e-mail, and decides whether data (WEB page) described in the e-mail needs to be downloaded. If the data needs to be downloaded, the user accesses the URL described in the e-mail (S43). The WEB server 2 reads out the relevant data (WEB page) from the cellular phone database 25, and transmits an e-mail including the read-out data as an attached file to the cellular phone 5 (S44). The cellular phone 5 stores the transmitted data (that is, WEB page) in the internal data storage unit 541 (S45). If corresponding data has been already stored in the data storage unit 541, the data, which has been already stored in the data storage unit 541, is overwritten by the transmitted data, and is updated.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mobile communication system, comprising:
a server for sending/receiving data through a network;
a computer for transmitting data to be used by a predetermined mobile communication terminal to the server; and
a mobile communication terminal for receiving the data from the server, the server comprising:
a database for storing data used by the respective mobile communication terminal for each mobile communication terminal;
a controlling unit for controlling the server and for controlling communication between the server and the mobile communication terminal and communication between the server and the computer;
a WEB page database for storing a plurality of WEB pages respectively corresponding to plural kinds of mobile communication terminals;
changing means for changing a format of a WEB page to be sent to a respective mobile communication terminal based on mobile communication terminal model information of the respective mobile communication terminal that is provided by a user of the computer during a login state between the computer and the server; and
means for sending a data upload program to the mobile communication terminal along with the WEB page,
wherein the format of the WEB page is changed to a format suitable for the respective mobile communication terminal, and is sent to the respective mobile communication terminal,
wherein the controlling unit inputs data transmitted from the computer to the database and transmits the data stored in the database to the mobile communication terminal in response to a request from the mobile communication terminal,
wherein the mobile communication terminal further comprises:
e-mail controlling means for receiving from the server an e-mail notifying a reception of the data by the server; and
a mobile terminal database for storing data,
wherein the e-mail identifies a URL to access a WEB page by which the user of the mobile communication terminal can access the data stored at the server, and
wherein data retrieved from the server and provided to the mobile communication terminal is compared to data currently stored in the mobile terminal database prior to retrieving of the data from the server, to determine whether or not any of the data currently stored in the mobile terminal database is to be overwritten with the data retrieved from the server.

2. The system according to claim 1,
wherein the server further comprises:
WEB page generating means for generating a WEB page enabling the data to be used by the mobile communication terminal to be input.

3. The system according to claim 1,
wherein the server further comprises:
e-mail transmitting means for notifying a reception of the data to be used by a mobile communication terminal to the mobile communication terminal.

4. The system according to claim 1, wherein the data used by the mobile communication terminal includes at least one of a phone number, a mail address, a bookmark, a schedule, setting data of a ringer, setting data of a display, and setting data of an alarm, and is one capable of being stored in the mobile communication terminal.

5. A server for sending/receiving data from/to a plurality of mobile communication terminals and a computer through a network,
the server comprising:
a database for storing data used by the respective mobile communication terminal for each mobile communication terminal; and
a controlling unit for controlling the server and for controlling communication between the server and the mobile communication terminal and communication between the server and the computer,
wherein the controlling unit inputs data transmitted from the computer to the database and transmits the data stored in the database to the mobile communication terminal in response to a request from the mobile communication terminal,
the server further comprising:
a WEB page database for storing a plurality of WEB pages respectively corresponding to plural kinds of mobile communication terminals;
changing means for changing a format of a WEB page to be sent to a respective mobile communication terminal based on mobile communication terminal model information of the respective mobile communication terminal that is provided by a user of the computer during a login state between the computer and the server; and
means for sending a data upload program to the mobile communication terminal along with the WEB page,
wherein the controlling unit of the server inputs data into the database that is transmitted from the mobile communication terminal by the data upload program, and wherein the format of the WEB page is changed to a format suitable for the respective mobile communication terminal, and is sent to the respective mobile communication terminal.

6. The server according to claim 5, wherein the data used by the mobile communication terminal includes at least one of a phone number, a mail address, a bookmark, a schedule, setting data of ringer, setting data of a display, and setting data of an alarm, and is one capable of being stored in the mobile communication terminal.

7. The server according to claim 5,
the server further comprising:
WEB page generating means for generating a WEB page enabling the data to be used by the mobile communication terminal to be input.

8. The server according to claim 5,
the server further comprising:
e-mail transmitting means for notifying a reception of the data to be used by a mobile communication terminal to the mobile communication terminal.

9. The server according to claim 8, wherein an e-mail transmitted to the mobile communication terminal includes a URL, and the mobile communication terminal accesses the URL to receive the data.

10. A mobile communication system, comprising:
a server for sending/receiving data through a network;
a computer for transmitting data to be used by a predetermined mobile communication terminal to the server; and
a mobile communication terminal for receiving the data from the server,
the server comprising:
a database for storing data used by the respective mobile communication terminal for each mobile communication terminal;
a controlling unit for controlling the server and for controlling communication between the server and the mobile communication terminal and communication between the server and the computer;
a WEB page database for storing a plurality of WEB pages respectively corresponding to plural kinds of mobile communication terminals;
changing means for changing a format of a WEB page to be sent to a respective mobile communication terminal based on mobile communication terminal model information of the respective mobile communication terminal that is provided by a user of the computer during a login state between the computer and the server; and
means for sending a data upload program to the mobile communication terminal along with the WEB page,
wherein the format of the WEB page is changed to a format suitable for the respective mobile communication terminal, and is sent to the respective mobile communication terminal,
wherein the controlling unit inputs data transmitted from the computer to the database and transmits the data stored in the database to the mobile communication terminal in response to a request from the mobile communication terminal, and
wherein the controlling unit of the server inputs data into the database that is transmitted from the mobile communication terminal by the data upload program.

11. The system according to claim 10,
wherein the server further comprises:
WEB page generating means for generating a WEB page enabling the data to be used by the mobile communication terminal to be input.

12. The system according to claim 10,
wherein the server further comprises:
e-mail transmitting means for notifying a reception of the data to be used by a mobile communication terminal to the mobile communication terminal.

13. The system according to claim 12, wherein the e-mail transmitted to the mobile communication terminal includes a URL, and the mobile communication terminal accesses the URL to receive the data.

14. The system according to claim 10, wherein the data used by the mobile communication terminal includes at least one of a phone number, a mail address, a bookmark, a schedule, setting data of a ringer, setting data of a display, and setting data of an alarm, and is one capable of being stored in the mobile communication terminal.

15. A data updating method in a mobile communication system,
the method comprising the steps of:
accessing a server through a network by a computer;
downloading a WEB page concerning a predetermined mobile communication terminal to the computer;
inputting data to be used by the mobile communication terminal to the WEB page and uploading the data to the server;
storing the data uploaded to the server in a database;
downloading the data from the server to the mobile communication terminal;
storing a plurality of WEB pages respectively corresponding to plural kinds of mobile communication terminals;
changing a format of a WEB page to be sent to a respective mobile communication terminal based on mobile communication terminal model information of the respective mobile communication terminal that is provided by a user of the computer during a login state between the computer and the server;
sending a data upload program to the mobile communication terminal along with the WEB page;
wherein the format of the WEB page is changed to a format suitable for the respective mobile communication terminal, and is sent to the respective mobile communication terminal;
uploading data to be used by the mobile communication terminal to the server by the data upload program; and
storing data that is transmitted from the mobile communication terminal by the data upload program into the database.

16. The data updating method according to claim 15, wherein the server notifies a reception of the data to a corresponding mobile communication terminal by an e-mail.

17. The data updating method according to claim 15, wherein the data used by the mobile communication terminal includes at least one of a phone number, a mail address, a bookmark, a schedule, setting data of a ringer, setting data of a display, and setting data of an alarm, and is one capable of being stored in the mobile communication terminal.

18. A mobile communication terminal communicating with a server through a network, comprising:
input means for receiving inputs by a user of the mobile communication terminal;
phone communication means for controlling a voice communication;
network access means for accessing the server through the network;
data transfer controlling means for controlling sending of data to the server and receiving of data from the server;
e-mail controlling means for receiving from the server an e-mail notifying a reception of the data by the server; and memory means for storing the data, the data including at least one of a phone number, a mail address, a bookmark, a schedule, setting data of a ringer, setting data of a display, and setting data of an alarm, wherein the memory means for storing the data stores data accessed by a WEB page accessed by a URL identified by the email received from the server, wherein at least a portion of the data sent to the server by the data transfer controlling means includes information entered into the memory means by the user of the mobile communication terminal by way of the input means.

\* \* \* \* \*